Dec. 27, 1966   A. A. C. MARCH   3,294,417
TRAILER WITH SELECTIVELY STEERABLE CASTORS
Filed July 14, 1964   4 Sheets-Sheet 3

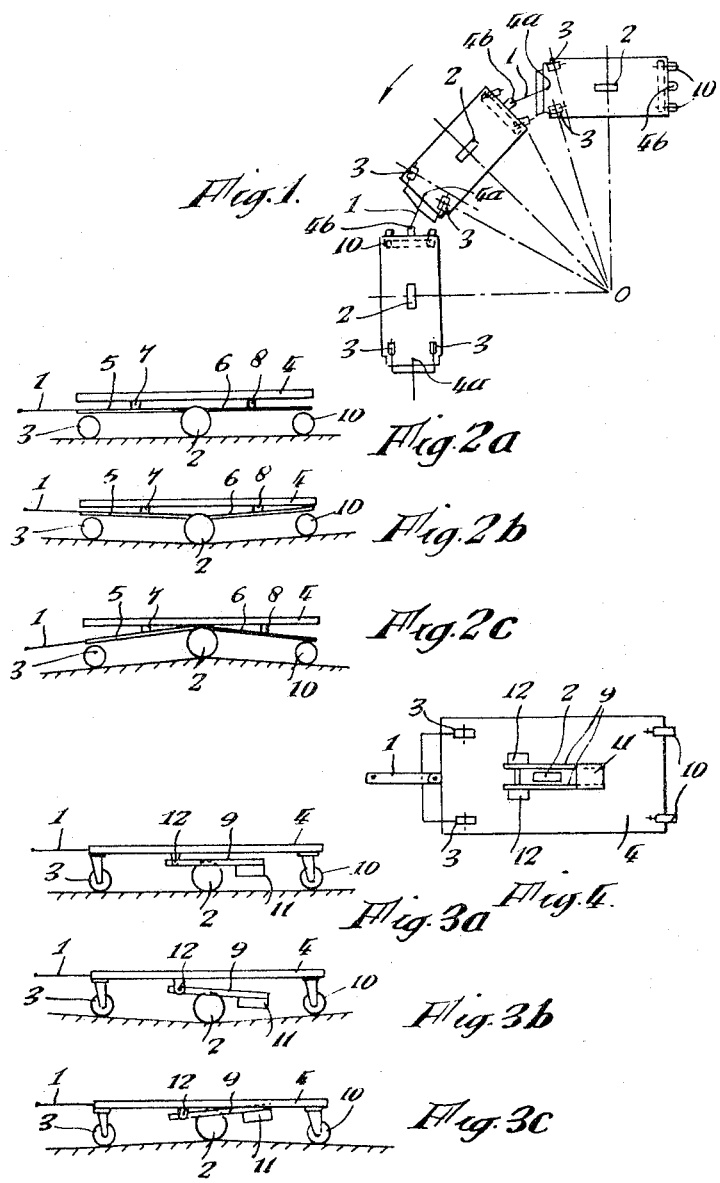

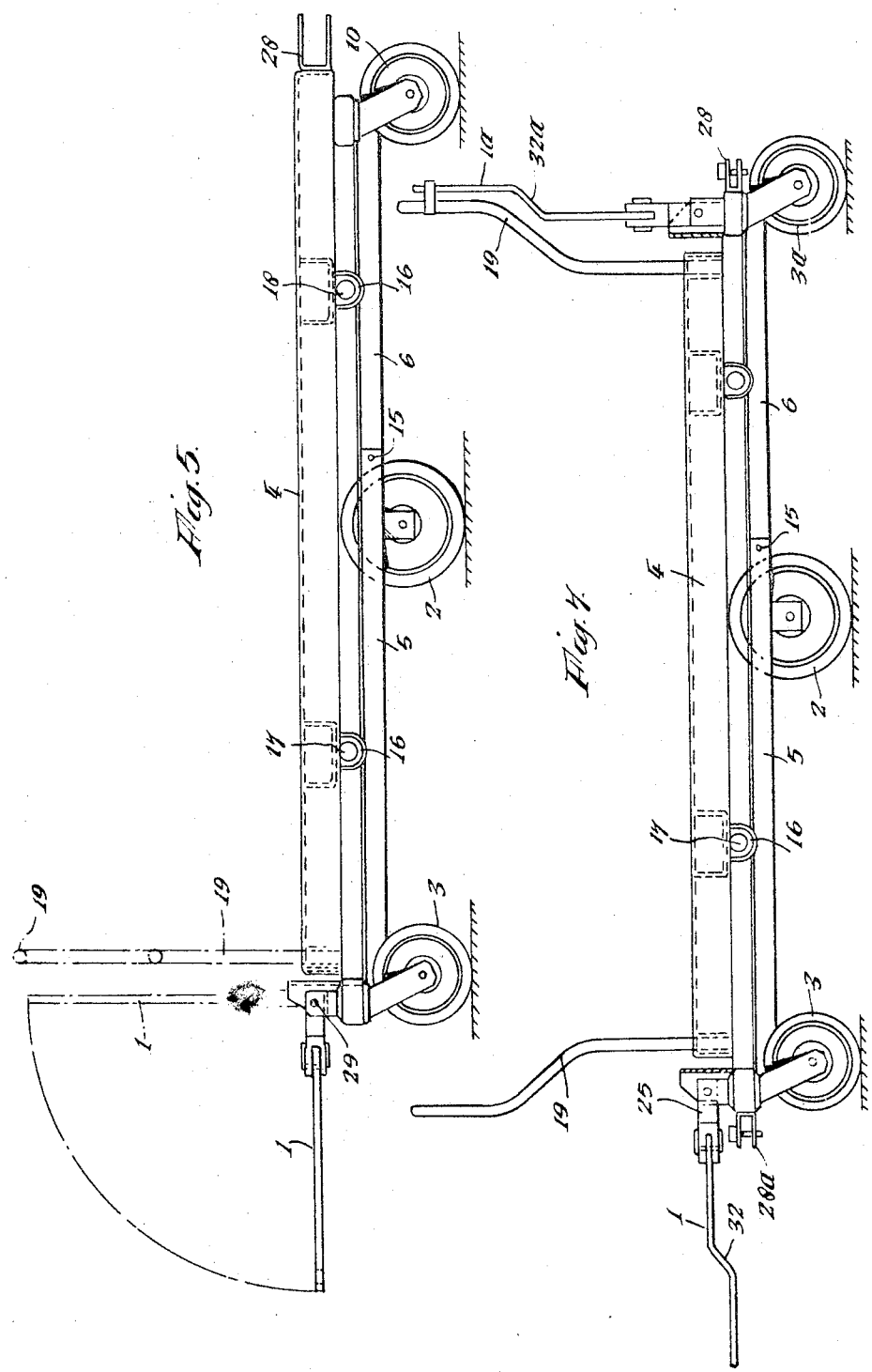

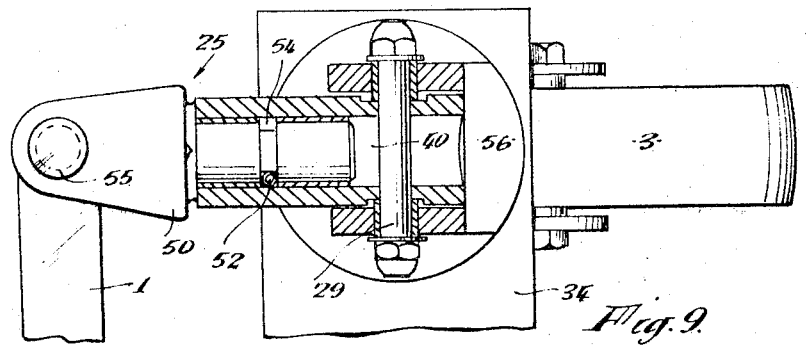
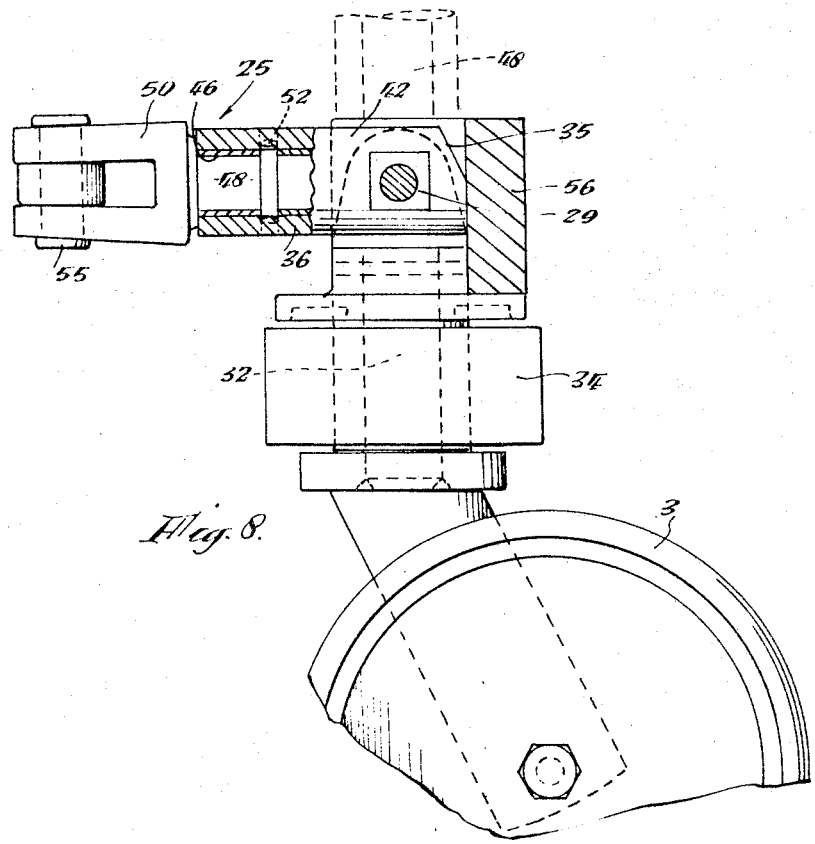

10

United States Patent Office 3,294,417
Patented Dec. 27, 1966

3,294,417
TRAILER WITH SELECTIVELY STEERABLE
CASTORS
Adrian Anthony Cecil March, Hartfield, England, assignor
to W. C. Youngman Limited, Crawley, England
Filed July 14, 1964, Ser. No. 382,588
Claims priority, application Great Britain, July 16, 1963,
28,138/63
12 Claims. (Cl. 280—408)

This invention relates to vehicles of the kind adapted to be coupled together in trains hereinafter referred to as trailers, and in particular to the means for steering such trailers. Such trailers have many uses and are commonly to be seen on railway station platforms, in factories and institutions where the transport of goods or freight is involved.

It is a well known disadvantage of the kind of trailer having four wheels the rear two of which are non-steerable and the front two of which are steerable by means of a drawbar, or in which the front wheels are self steering by being independent castors, that when coupled together in a train the trailers do not follow accurately in the path taken by the trailer in front of the tractor hauling the train, but cut the corners or follow a sinuous path. This disadvantage can be very serious when it is required to negotiate turns in narrow passages with the train. Another disadvantage of a steered wheel construction is that when not coupled in a train the drawbar still has to be manipulated to manoeuvre the trailer.

One object of the present invention is to provide trailers of the kind adapted to be coupled together which do not have the disadvantages above referred to and when coupled as a train will follow closely the path taken by the preceding trailer.

According to another aspect the invention relates to a castor for a trolley, trailer or the like device hereinafter called "a trolley" for use in the handling and transport of goods. Many such devices are used in workshops, factories, hospitals and like buildings and by undertakings such as railways where they find considerable use for parcels and goods that have to be moved from one platform to another or to a storage site. Such trolleys are usually adapted to be coupled together by drawbars to form a train or for individual handling the drawbars being pivoted about a longitudinal axis so that they can be raised to a storage position when not required.

In order to provide for maximum manoeuvrability such trolleys should be mounted entirely on castors so that movement in any direction is possible. On the other hand it is often desirable to be able to steer the trolley along a desired path which is far too difficult to achieve with certainty if all supporting wheels are castors. In consequence it has been proposed to provide a castor with means by which it can be coupled to and uncoupled from a drawbar or like steering arm or other device (hereinafter termed "steering arms") but hitherto such an arrangement has not been entirely satisfactory because before coupling can be effected the castor has to be set so that the coupling member on the steering means can be engaged with the complementary member on the castor.

Another object of the present invention is to provide a steerable castor which will overcome the above difficulties.

According to the present invention there is provided a castor and steering means assembly for a trolley wherein the swivel shaft of the castor is coupled to said steering means by a coupling including two pivots arranged at right angles to each other one of which pivots can be bit into axial alignment with the swivel shaft of the castor by pivotal movement about the other so that said castor can swivel without moving said steering means. The pivotal movement may be effected by moving the steering means to a storage position and means may be provided to inhibit pivotal movement unless the castor is trailing in relation to the steering means. Said steering means may be a draw bar.

Further according to the present invention there is provided a vehicle for coupling in trains said vehicle having a chassis, two steerable supporting and direction controlling means at the front of said chassis, in lateral spaced relation, two self aligning supporting means at the rear of said chassis in lateral spaced relation, a towing point and a hitch point respectively at the front and rear of said chassis, a mounting on said chassis disposed substantially centrally between said towing point and hitch point, lateral movement restraining means in said mounting, said mounting constructed and arranged to permit movement of said restraining means towards and away from the ground, said restraining means by contact with the ground resisting movement of said chassis in a direction at right angles to a line joining said towing point and said hitch point, means for urging said restraining means towards the ground, a drawbar pivoted to said towing point and linkage connecting said drawbar to said supporting and direction controlling means.

The two steerable supporting and direction controlling means, the two self aligning and supporting means and the lateral movement restraining means may be wheels.

The means for urging the lateral movement restraining means towards the ground may be a weighted lever or the chassis may include an articulated subframe with front and rear subframe members.

The accompanying drawings show by way of example only a number of embodiments of the invention in which:

FIG. 1 is a diagrammatic plan view of part of a train of trailers,

FIGS. 2a, 2b and 2c are diagrammatic side elevations of a first embodiment showing the effect of running over an uneven floor, FIGS. 3a, 3b and 3c are diagrammatic side elevations of a second embodiment showing the effect of running over an uneven floor.

FIG. 4 is a diagrammatic plan view of the underside of the embodiment of FIG. 3, FIGS. 5 and 6 are a side elevation and plan view respectively of the embodiment of FIG. 2.

FIG. 7 is a diagrammatic elevation of a double ended trailer similar to that shown in FIGS. 5 and 6 but provided with steerable castors at both ends.

FIG. 8 is a longitudinal sectional elevation to an enlarged scale of the coupling means shown in FIGS. 1 and 2.

FIG. 9 is a plan view of FIG. 8.

FIG. 1 shows the requirements for the positioning of the wheels of a train of trailers so that each trailer will follow, faithfully enough for all practical purposes, the tracks of the preceding trailer.

Figure 6:
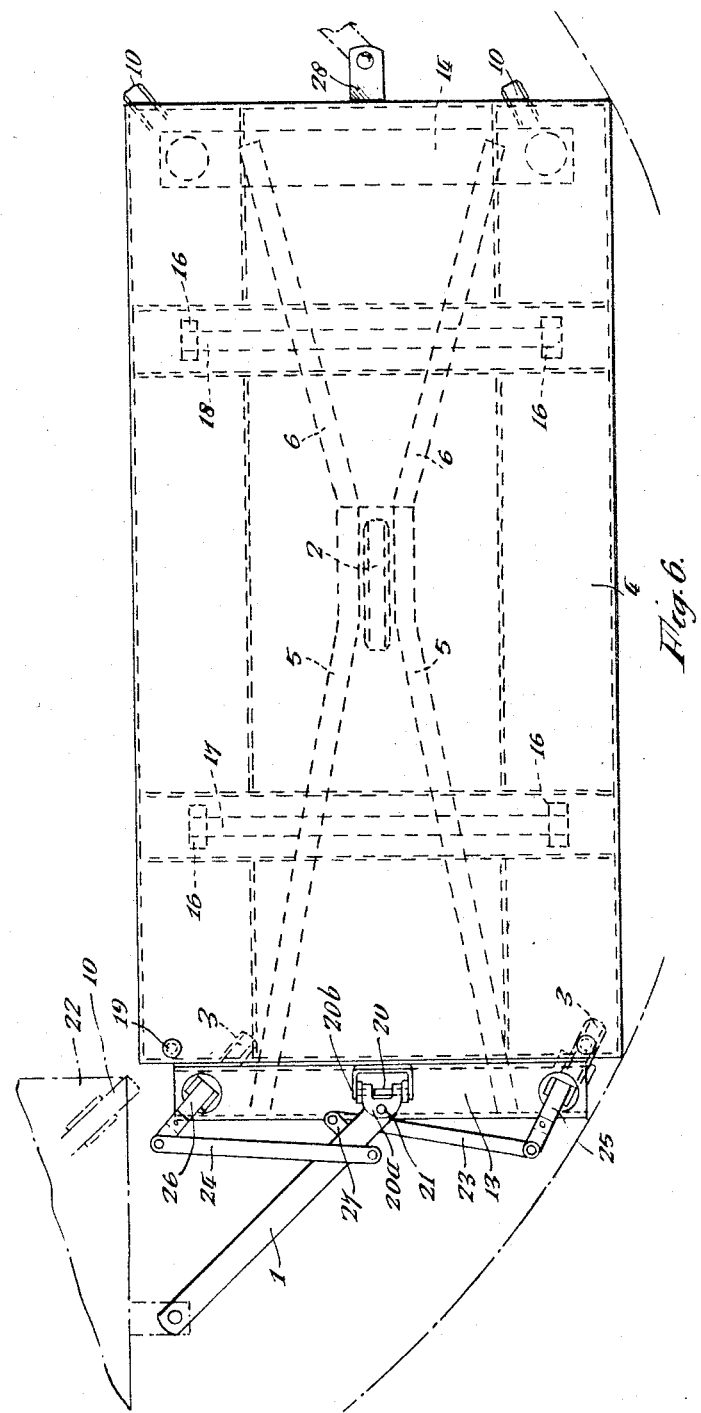

In the form shown diagrammatically in FIGS. 1 and 2 each trailer comprises a platform 4 having a subframe made up of front and rear subframe members 5 and 6 respectively pivotally mounted in brackets 7 and 8 on the underside of the platform 4 and linked together at their adjacent ends by means not shown such as a pin and slot connection and on one of which subframe members is mounted the axle of a central non-steerable supporting wheel 2. The front subframe member 5 carries on horizontal and vertical pivots at its front end a drawbar 1 and two steerable castors 3 which are steerably connected to the said drawbar 1, so that on a curve their axes pass through the centre of curvature shown at O in FIG. 1.

The said vertical point forms one of the before mentioned attachment points the other being a hitch point 4b at the rear of each platform. The rear frame member 6 carries at its rear end the two self steering castors 10.

With the arrangement described above when the trailers are being drawn around a curve of constant radius the axes of the respective wheels pass substantially through a common point O. The vertical pivots at the attachment points 4a and 4b are substantially equidistant from the axis of the central non-steerable wheel 2, and consequently the perpendicular bisectors of the drawbars also pass substantially through the said common point O.

Since the position of the rearward ends of the trailers is determined by the central and forward wheels it is only necessary to provide at this location a pair of self-steering wheels 10. As each trailer has a wheel at each corner, maximum stability is obtained by this arrangement.

All the wheels will remain in contact with the ground when passing over ramps and such like undulations in the floor since the mounting of the non-steerable centrally disposed wheel 2, permits it to move vertically relative to the other supporting wheels. The sharing of the load in the arrangement shown results in approximately half the load being supported by the non-steerable wheel 2 which is thus held firmly in contact with the ground and the remainder distributed between the four castors which can thus be of comparatively lightweight construction, and since the load on the castors is reduced they swivel more easily.

In the alternative embodiment of FIGS. 3 and 4 the central wheel is urged to contact the floor under all conditions of running by being mounted upon a pair of pivoted levers 9 which have a weight 11 at their free end and are hinged to the trailer at point 12.

FIGS. 5 and 6 show in more detail the arrangement shown diagrammatically in FIG. 2. The forward wheels 3 and the rear wheels 10 are mounted upon cross members 13 and 14 respectively, which form the ends of the subframe parts 5 and 6, the two parts being connected at 15 adjacent to central wheel 2, by a pin in one subframe engaging a slot in the other.

The platform 4 is supported from the subframe fore and aft upon the bearings 16 at the ends of the tubular members 17 and 18 whose positioning closer together or further apart changes the proportion of the load upon the central wheel. For convenience of manipulation by hand the platform 4 is provided with upstanding rails 19.

The front wheels 3 may operate in two ways, being constructed to operate as self-steering castors, when the trailer is being manipulated by hand for example by means of the rails 19, and having a modified Ackerman steering gear as shown in FIG. 6 for use when the trailer is coupled to a tractor or other trailer by the drawbar 1. The drawbar 1 is connected to the member 13 by a block 20a so as to be hingeable vertically about a horizontal pin 20 secured in a bracket 20b, and horizontally about a pin 21 in the block 20a when coupled to another trailer 22 in front, and acts to steer the front wheels 3 by way of track rods 23 and 24 and steering arms 25 and 26 attached to the vertical spindle of the castor support for the wheels 3.

The inner ends of the track rods 23 and 24 are hinged to projections 27 on the drawbar 1 in such position as to give the required different steering effect to the two front wheels. The drawbar attachment or towing hitch at the rear of the trailer consists of a bracket 28 welded to the rear of the platform 4 the attachment point provided by the bracket 28 being made substantially of equal distance from the axis of the wheel 2 as is the hinge pin 21 which is the attachment point of the drawbar 1 in the front of the trailer, if the ideal conditions are to be attained, but a slight variation may be made without affecting the trailing efficiency unduly.

In order that the steering may be uncoupled from the front wheels when the trailer is to be manipulated by hand and the wheels 3 allowed to be self steering by castor action, the vertical spindles of the castors are forked at their upper ends and support the ends of the steering arms 25 and 26 upon horizontal pins 29, so that the steering arms are hingeable in a vertical plane, and also, to allow the castor spindle to rotate when the drawbar is in a vertical position, the steering arms 25 and 26 are made in two parts, rotatable about the common longitudinal axis, the end of one being housed in a bore in the other and prevented from separating by a pin in one engaging in a groove in the other. Means (not shown in FIGS. 5 and 6), such as a clip mounted on the rails 19 are provided for retaining in a vertical position the drawbar 1 together with the steering arms 25 and 26.

When it is required to engage the steering means after the trailer has been manipulated by hand, it is merely necessary to move the trailer in a longitudinal direction a short distance forward to cause the two front wheels to become substantially parallel and the drawbar can be lowered and the castors fixed in their steerable manner.

An advantage of the form of construction in which the non-steerable wheel is central longitudinally of the platform is that, when this wheel is provided with a brake, weight transfer from this wheel does not take place during braking, and efficient braking results.

In order to provide more than half the unladen weight imposed upon the central wheel 2, a spring may be provided between the subframe 5, 6 and the platform 4, for example a compression spring may be positioned close to the wheel 2 of such strength that say 80% of the weight of the unladen platform is supported by this wheel. By this means when on a curve there is less danger of the wheel 2 of an unladen trailer being dragged sideways by the drawbar load of the remainder of the train. This means also assists the braking of an unladen trailer when a brake is fitted to this wheel as mentioned in the preceding paragraph.

Although in the above description mention is made only of trailers supported upon wheels, it is to be understood that the principle upon which the invention works may equally well be applied to vehicles having other direction controlling and load bearing devices such as tracks, skids and skates, and is also applicable to boats and other vehicles having direction controlling devices which do not also serve to sustain the load.

The modified form of trailer shown in FIG. 7 is double ended the rear wheels 10 being replaced by steerable wheels 3a and the hitch point lug 28 is mounted at a lower level so as not to obstruct movement of the drawbar 1a. At the front end an additional hitch point bracket 28a is provided. The drawbars 1 and 1a are both cranked at 32 and 32a respectively to bring the free ends of the drawbars level with the hitch points. Obviously such a trailer can be coupled to travel in either direction without having to be turned round but whichever drawbar is at the back must be raised to the vertical position as shown to allow the steerable wheels with which it is associated to swivel freely as castors.

Now turning to FIGS. 8 and 9 in which the construction of the steering arm 25 is shown in greater detail it will be seen that the trolley end part 40 of the two part steering arm 25 next the castor has a tongue 42 which fits the fork 35 of the swivel axle 32 and is secured therein by the horizontal pivot pin 29. The upper end of the lower end part 40 is drilled axially to form a socket 46 for the reception of a spigot 48 formed on the trolley end of the other part 50 of the steering arm 25. A retaining pin 52 set in the part 40 enters the socket 46 to engage tangentially an annular groove 54 in the spigot 48 to retain said spigot 48 against axial withdrawal whilst permitting free rotation in the socket 46. The other end of the part 50 is bifurcated to receive the drawbar 1 secured therein by a pivot pin 55.

It will thus be clear that when the drawbar 1 is raised to the position indicated in dotted lines the spigot 48 will be co-axial with the swivel axle 32 of the castor 3 so that the castor is free to turn in any direction. In order to ensure that the drawbar 1 cannot be lowered unless the castors are both trailing the back of the fork 35 is closed by a part 56.

With this arrangement the steering arms are always coupled to the swivel axles and to the drawbar 1 so that in the vertical or stored position of the drawbar 1 the castors 3 are free to swivel into any position yet when the drawbar 1 is lowered they are connected to the drawbar 1 for steering thereby.

What I claim and desire to secure by Letters Patent is:

1. A vehicle for coupling in trains, said vehicle having a chassis, two selectively self aligning or direction controlling supporting means at the front of said chassis, in lateral spaced relation, two self aligning supporting means at the rear of said chassis in lateral spaced relation, a towing point and a hitch point fixed relatively to the longitudinal axis of the vehicle in plan view respectively at the front and rear of said chassis, a mounting on said chassis disposed substantially central between said towing point and hitch point, lateral movement restraining means in said mounting, said mounting constructed and arranged to permit movement of said restraining means towards and away from the ground, said restraining means by contact with the ground resisting movement of said chassis in a direction at right angles to a line joining said towing point and said hitch point and providing support of said chassis between said front and rear supporting means, means for urging said restraining means towards the ground, a drawbar pivoted to said towing point and linkage connecting said drawbar to said self aligning supporting and direction controlling means.

2. A vehicle according to claim 1 wherein said selectively self aligning or direction controlling supporting means comprises castor wheels and said lateral movement restraining means comprises a non-steerable wheel.

3. A vehicle according to claim 1 wherein the means for urging said lateral movement restraining means towards the ground comprises a weighted lever.

4. A vehicle according to claim 1 wherein the chassis includes a main frame and an articulated subframe consisting of front and rear subframe members one of which carries said mounting, said front and rear subframe members being linked together by their adjacent ends and supported intermediate their ends from the main frame, the front subframe member carrying the steerable supporting and direction controlling means and the rear subframe carrying the self aligning supporting means.

5. A trailer according to claim 1 wherein said steering means includes a drawbar, steering arms connected to said steerable castors and links connecting said steering arms to said drawbar wherein said links are pivotally connected to the drawbar in overlapping spaced relation.

6. A trailer having a body, a supporting castor for said body disposed substantially at each corner of a rectangle, a front drawbar, means for steerably coupling said front drawbar to the castor mounted supporting means at the front of the trailer for steering said trailer, a non-steering rear drawbar hitch point and a yieldable wheel mounting carrying a non-steerable ground contacting wheel rotatable about an axis transverse of the trailer said wheel making ground contact midway between said hitch point and the attachment point of said drawbars to said trailer.

7. A steering means assembly for a vehicle comprising a supporting and direction controlling means pivotally mounted on said vehicle for turning around a swivel axis, a steering arm pivotally connected to said supporting and direction controlling means for movement about a horizontal axis, a drawbar, means connecting said steering arm to said drawbar, said steering arm also including an axially arranged pivot, said assembly being constructed and arranged to permit said steering arm axial pivot to be brought into axial alignment with said swivel axis when said drawbar is in a non-towing position to enable said supporting and direction controlling means to swivel freely in such position.

8. A steering means assembly according to claim 7 wherein means are provided on said supporting and direction controlling means to prevent movement about said horizontal pivot unless said supporting and direction controlling means are castorwise trailingly positioned relative to said drawbar.

9. A trailer having a castor mounted supporting means disposed substantially at each corner of a rectangle, a front drawbar, means for steerably coupling said front drawbar, means for steerably coupling said front drawbar to said castor mounted supporting means at the front of the trailer for steering said vehicle, a non-steering rear drawbar hitch and a yieldable mounting carrying a non-steerable ground contacting and supporting means providing resistance to movement of said trailer perpendicular to the longitudinal axis thereof, said supporting means making ground contact midway between said hitch point and the attachment point of said drawbar to said trailer.

10. A trailer according to claim 9 wherein said drawbar is disconnectably coupled to said castor mounted supporting means whereby said trailer can be manipulated without the use of the drawbar as steering means.

11. A trailer according to claim 9 wherein a drawbar is provided at each end of the trailer disconnectably coupled to the castor mounted supporting means at that end and a non-steering drawbar hitch is also provided at each end whereby said trailer can be towed from either end by said drawbar at that end and another trailer can be towed by said hitch at the other end.

12. A trailer according to claim 9 wherein the two self-aligning supporting means at the rear of said vehicle are also steerable, both ends of the vehicle are provided with a drawbar pivoted to a towing point and disconnectable linkage means are provided at each end connecting said drawbar to said self-aligning supporting means respectively and each end of said vehicle is provided with a hitch point fixed relatively to the longitudinal axis of said vehicle whereby said vehicle can be steerably towed, one said drawbar from either end can tow a succeeding vehicle by the hitch point at the other end.

References Cited by the Examiner

UNITED STATES PATENTS 2,537,521  1/1951  Forbes _____ 280—116

FOREIGN PATENTS 24,232  1905  Great Britain.
348,604  2/1905  France.
1,152,834  9/1957  France.
1,303,042  7/1962  France.

LEO FRIAGLIA, *Primary Examiner.*